(12) United States Patent
Huber

(10) Patent No.: US 7,204,772 B2
(45) Date of Patent: Apr. 17, 2007

(54) TORSIONALLY FLEXIBLE COUPLING, A MOLD, AND A METHOD OF PRODUCING SAME

(75) Inventor: Winfried Huber, Neuenburg (DE)

(73) Assignee: Carl Freudenberg KG (DE)

( * ) Notice: Subject to any disclaimer, the term of this patent is extended or adjusted under 35 U.S.C. 154(b) by 285 days.

(21) Appl. No.: 10/388,552

(22) Filed: Mar. 14, 2003

(65) Prior Publication Data

US 2003/0199348 A1 Oct. 23, 2003

(30) Foreign Application Priority Data

Mar. 15, 2002 (DE) .............................. 102 11 640

(51) Int. Cl.
*F16D 3/00* (2006.01)

(52) U.S. Cl. ............................................. 474/94

(58) Field of Classification Search ................ 474/86, 474/94, 135, 166; 384/286; 267/154, 279, 267/281
See application file for complete search history.

(56) References Cited

U.S. PATENT DOCUMENTS

| | | | | |
|---|---|---|---|---|
| 3,601,459 A | | 8/1971 | Cutting ..................... 308/238 |
| 4,033,642 A | * | 7/1977 | Sorgatz et al. ............. 384/215 |
| 5,516,331 A | * | 5/1996 | Morr et al. .................... 464/7 |
| 5,540,626 A | * | 7/1996 | Asai et al. ..................... 474/94 |
| 5,695,176 A | | 12/1997 | Colford ..................... 267/155 |
| 5,966,996 A | | 10/1999 | Hamaekers .................. 74/574 |
| 5,988,015 A | * | 11/1999 | Riu .............................. 74/574 |
| 6,106,421 A | * | 8/2000 | Graber et al. ................ 474/94 |
| 6,183,137 B1 | | 2/2001 | Kojima et al. ............. 384/297 |
| 6,702,681 B1 | * | 3/2004 | Ochs ............................ 464/90 |

FOREIGN PATENT DOCUMENTS

| | | | |
|---|---|---|---|
| DE | 4400564 C1 | * | 4/1995 |
| DE | 19506454 C1 | * | 5/1996 |
| DE | 19809528 | | 9/1998 |
| DE | 19938461 | | 3/2001 |
| DE | 10045453 | | 4/2002 |
| GB | 1401425 | | 7/1975 |
| JP | 05332419 A | * | 12/1993 |
| JP | 6-330957 | | 11/1994 |
| JP | 7-229538 | | 8/1995 |
| JP | 8-285012 | | 11/1996 |
| JP | 9-287648 | | 11/1997 |
| JP | 63-78722 | | 4/1998 |
| JP | 2000-104801 | | 4/2000 |
| JP | 2000-266047 | | 9/2000 |

* cited by examiner

*Primary Examiner*—Vicky A. Johnson
(74) *Attorney, Agent, or Firm*—Harness, Dickey & Pierce, P.L.C.

(57) ABSTRACT

A torsionally flexible coupling has a hub ring and a vibrationally isolated pulley surrounding the hub ring at a radial distance, a spring body made of a rubber-elastic material being situated in the gap formed by the distance, and comprises a sliding-contact bearing for mutual support of the hub ring and the pulley, the sliding-contact bearing having a sliding-contact surface on the side facing the hub ring or the pulley, the sliding-contact surface having at least one elastically flexible projection in the radial direction which comes in contact with the surface of the hub ring or the pulley under elastic prestress.

12 Claims, 7 Drawing Sheets

Detail "X"

TORSIONALLY FLEXIBLE COUPLING, A MOLD, AND A METHOD OF PRODUCING SAME

Priority to German Patent Application No. 102 11 640.7-12, filed Mar. 15, 2002 and hereby incorporated by reference herein, is claimed.

BACKGROUND INFORMATION

The present invention relates to a torsionally flexible coupling.

Such couplings are known in general and include a hub ring and a vibrationally isolated pulley surrounding the hub ring at a radial distance, a spring body made of a rubber-elastic material being situated in the gap formed by the distance, and a sliding-contact bearing for mutual support of the hub ring and the pulley. The sliding-contact bearings used are usually constructed of metallic materials in multiple layers. A sliding-contact surface of the bearing may be formed by a thin layer of a copper alloy and therefore has adequately good dry-running properties when insufficiently lubricated.

Due to their function, conventional sliding-contact bearings must be mounted with a small radial play in the gap, which is delimited by the concentric machine elements. Due to the sliding-contact bearing, which has been installed with some play, unwanted rattling sounds occur during the intended use of the torsionally flexible coupling, and these are especially unpleasant when the torsionally flexible coupling is used in quiet, high-class motor vehicles, for example.

BRIEF SUMMARY OF THE INVENTION

An object of the present invention is to improve upon a torsionally flexible coupling, so that operating noises are effectively reduced.

The present invention thus provides a torsionally flexible coupling, including a hub ring and a vibrationally isolated pulley surrounding the hub ring at a radial distance, a spring body made of a rubber-elastic material being arranged in the gap formed by the distance, and a sliding-contact bearing for mutual support of the hub ring and the pulley, the sliding-contact bearing having a sliding-contact surface on the side facing the hub ring or the pulley, the sliding-contact surface having at least one elastically flexible projection in the radial direction which comes in contact with the surface of the hub ring or the pulley under an elastic prestress. Due to the elastic prestress with which the sliding-contact bearing comes in contact with the adjacent machine element, i.e., the hub ring or the pulley, the result is a positioning of the sliding-contact bearing within the gap without play, the gap being delimited by the two machine elements. Due to the play-free allocation of the sliding-contact bearing to the machine elements, troublesome noises during operation can be avoided.

According to another advantageous embodiment, it is possible for the sliding-contact bearing to be designed in one piece and of a uniform material. The sliding-contact surface and the projection are then made of one piece of a uniform material. It is an advantage here that the manufacture and assembly of such a sliding-contact bearing may be performed easily and inexpensively.

The sliding-contact bearing is preferably made of a suitable polymer material. A thermoplastic polymer material is especially suitable for producing the projections, because the projections are produced as part of the sliding-contact bearing by creative forming under the influence of heat and pressure. Self-lubricating polymer materials have proven especially successful in the production of sliding-contact bearings, because such materials have excellent dry-running properties even in the absence of lubrication, are available inexpensively and are easily shapable under heat and pressure.

The sliding-contact surface may have at least three projections distributed uniformly in the circumferential direction. It is advantageous here that the sliding-contact bearing is concentric with the hub ring or pulley. Any imbalance and/or wobbling movement, which is a disadvantage, especially when the sliding-contact bearing is used in a torsionally flexible coupling, may be prevented by the plurality of projections distributed uniformly in the circumferential direction. In addition, it is also advantageous that as more projections of the same size are provided, the specific pressure per unit of area due to operation becomes lower on each individual projection. In general, however, it should be pointed out that the projections come in contact with the radially adjacent surface of the machine element under elastic prestress, and therefore there is a play-free construction in each case.

At least one cam, which is designed as an anti-twist element may be provided on the sliding-contact surface. The cam may be supported, for example, in the form of a rubber strip attached to the machine elements in a rotationally fixed manner in an elastic receptacle. This results in a friction-locked and/or form-fitting connection of the sliding-contact bearing to the machine element radially adjoining the rubber strip by way of the rubber strip and a rotationally fixed pairing of these parts relative to one another. Relative rotation then occurs only between the sliding-contact surface of the sliding-contact bearing and the machine element facing the sliding-contact surface.

The number of projections may correspond to the number of cams, with the projections and the cams being assigned to one another, e.g., in a staggered manner. Due to such an arrangement of projections and cams, the sliding-contact bearing has a mostly constant material thickness, as seen in the peripheral direction, which is an advantage to be emphasized from the standpoint of ease of manufacture without an unwanted accumulation of material and the resulting differences in shrinkage stresses.

The cams may be in rotationally fixed engagement with an elastic receptacle, in which case the elastic receptacle is situated between the pulley and the sliding-contact bearing or between the hub ring and the sliding-contact bearing in the radial direction. The elastic receptacle may be formed by a rubber strip, for example. If the elastic receptacle is attached to the inside circumference of the pulley, for example, then the cams of the sliding-contact bearing are supported on the elastic receptacle on the inside peripherally. This ensures that the pulley, the elastic receptacle, and the sliding-contact bearing are prevented from rotating relative to one another during use of the coupling as intended. Relative rotation takes place only between the hub ring and the sliding-contact bearing which encloses the sliding-contact surface of the hub ring on the outer perimeter.

On the other hand, if the elastic receptacle is attached to the hub ring and the inside circumference of the sliding-contact bearing in a rotationally fixed manner, then a relative rotation occurs only between the outside circumference of the sliding-contact bearing and the inside circumference of the pulley, the projections extending radially outward from the outside circumference of the sliding-contact bearing.

The pulley, the receptacle and the sliding-contact bearing or the hub ring, the receptacle and the sliding-contact bearing may form a prefabricatable unit. In the first case, the prefabricatable unit is connected to a hub ring and in the second case to a pulley. Assembly of the coupling is greatly simplified by the manufacture of a prefabricatable unit because in principle only two parts, namely the prefabricatable unit and the hub ring or the pulley must be assembled.

The elastic receptacle may be designed as a rubber strip which is attached in a rotationally fixed friction-locked and/or form-fitting manner to the sliding-contact bearing.

According to an advantageous embodiment, it is possible for the hub ring to have an essentially Z-shaped design, when observed in a longitudinal section, so that the first axial projection on the inside radially is enclosed by the inside circumference of the spring body, and the second axial projection on the outside radially is surrounded by the sliding-contact bearing. Such a torsionally flexible coupling has a simple design with a small number of parts, which is an advantage to be emphasized from the manufacturing and economical standpoint.

Furthermore, the present invention relates to a vulcanization mold for manufacturing a torsionally flexible coupling, including a hub ring and a pulley which is vibrationally isolated and surrounds it at a radial distance, a spring body made of a rubber-elastic material being situated in the gap formed by the distance, and also including a sliding-contact bearing for mutual support of the hub ring and the pulley, the sliding-contact bearing having a sliding-contact surface on the side facing the hub ring, the sliding-contact surface having at least one elastically flexible projection in the radial direction which comes in contact with the surface of the hub ring under elastic prestress, and the sliding-contact bearing being made of a thermoplastic polymer material, including a mold cavity into which the pulley and a sliding-contact bearing blank are insertable and a core which is surrounded on the outside circumference by the sliding-contact bearing blank during use of the vulcanization mold as intended, the core having at least one flattened area on the outside circumference, corresponding in shape and size to the projection of the ready-to-use sliding-contact bearing, injection nozzles for free-flowing elastomer material being situated radially between the inside circumference of the pulley and the outside circumference of the sliding-contact bearing blank to produce the receptacle.

It is especially advantageous that the core has at least one flattened region on the outside circumference, but preferably has a plurality of flattened regions distributed uniformly over the circumferential direction on which the sliding-contact bearing blank automatically rests during the production of the elastic receptacle. The sliding-contact bearing blank at first has an essentially cylindrical inside circumferential surface, the projections being formed subsequently by the fact that the inside circumferential surface of the sliding-contact bearing blank comes to rest on the outside circumference of the core due to the manufacturing process. This then results in the projections of the sliding-contact bearing due to the deformation of the sliding-contact bearing blank in the area of the flattened regions of the core; in the ready-to-use coupling, these projections on the sliding-contact bearing come to rest against the surface of the radially adjacent machine part.

In addition, the present invention also relates to a method of manufacturing a torsionally flexible coupling including a hub ring and a vibrationally separated pulley surrounding the hub ring at a radial distance, a spring body of a rubber-elastic material being arranged in the gap formed by this distance, and including a sliding-contact bearing for mutual support of the hub ring and the pulley, the sliding-contact bearing having a sliding-contact surface on the side facing the hub ring, the sliding-contact surface having at least one elastically flexible projection in the radial direction coming in contact with the surface of the hub ring under elastic prestress, the sliding-contact bearing being made of a thermoplastic polymer material; in a first method step the pulley and the sliding-contact bearing blank are inserted into the mold cavity in such a way that the sliding-contact bearing blank surrounds the core on the outside, which has been flattened on the outside peripheral surface; in a second method step, free-flowing elastomer material is injected into the annular gap between the pulley and the sliding-contact bearing blank to produce the receptacle, and due to the production process, the sliding-contact bearing blank automatically comes to rest on the surface of the core, which has been provided with at least one flattened region, due to the injection pressure and temperature; and in a third method step, after solidification and cooling of the elastomer material, the prefabricatable unit including the pulley, the receptacle made of the elastomer material, and the ready-to-use sliding-contact bearing is removed from the mold cavity; and in a fourth method step it is assembled with the hub ring to form a torsionally flexible coupling.

The second method step is especially advantageous because the free-flowing elastomer material of which the elastic receptacle is made ensures an automatic contact of the inside peripheral surface of the sliding-contact bearing blank with the outside circumference of the core due to the production method, the injection pressure, and injection temperature of the elastomer material. Due to the fact that the inside circumferential surface of the sliding-contact bearing blank is in contact with the outside circumference of the flattened core, corresponding congruently shaped projections are formed in the area of the flattened regions of the core on the inside circumferential surface of the sliding-contact bearing without requiring any cutting manufacturing methods, for example.

BRIEF DESCRIPTION OF THE DRAWINGS

A torsionally flexible coupling according to the present invention, a detail of a vulcanization mold and the method of manufacturing the torsionally flexible coupling are explained in greater detail below on the basis of the figures.

The drawing schematically shows the following.

DETAILED DESCRIPTION

Figure 1:
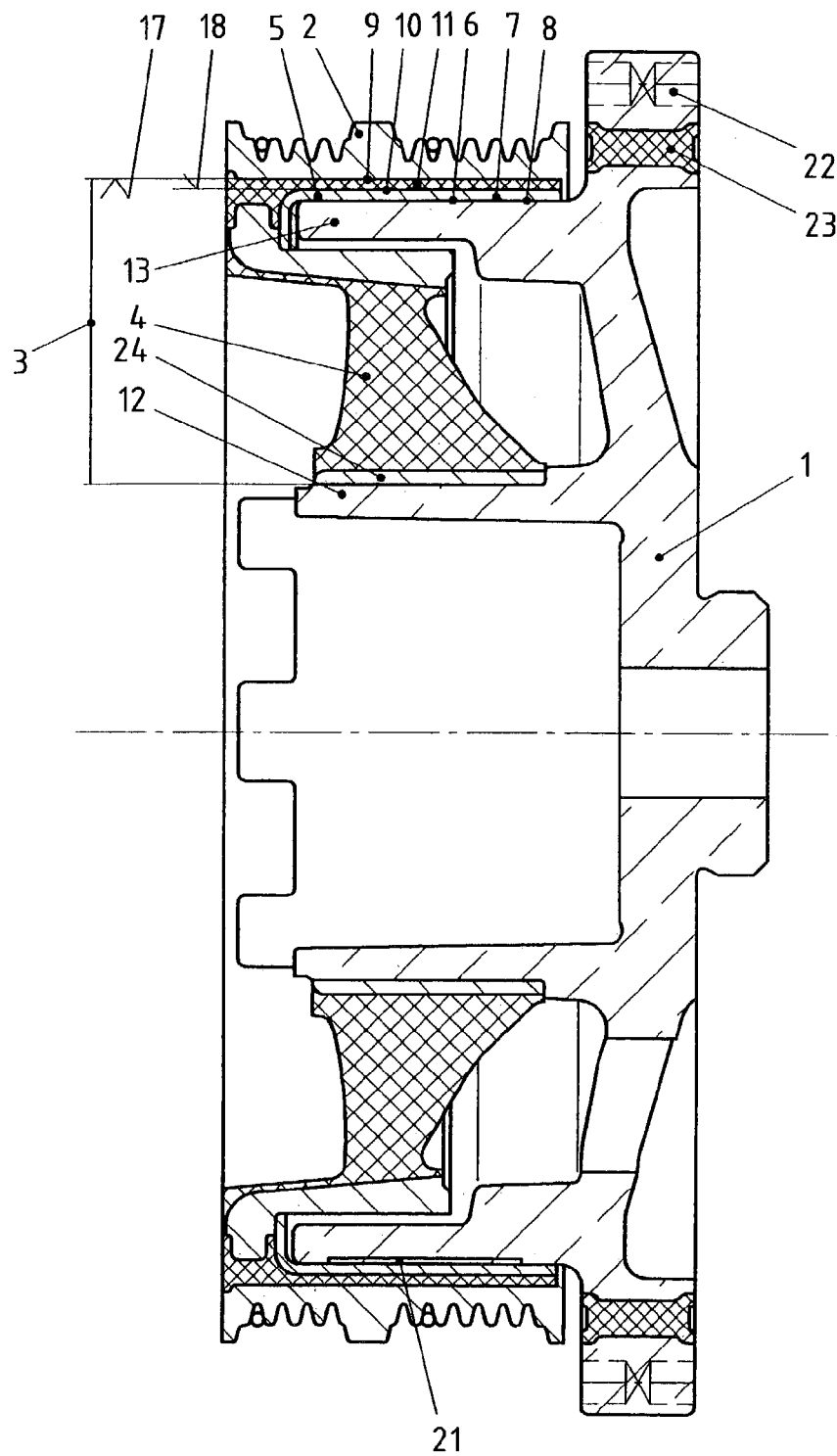
FIG. 1 shows an exemplary embodiment of a torsionally flexible coupling in a ready-to-use state.

FIG. 1 shows the sectional view of an exemplary embodiment of a torsionally flexible coupling. The coupling includes a hub ring 1, which is attached in a rotationally fixed manner to a crankshaft (not shown here) of an internal combustion engine. Hub ring 1 is made of a metallic material and is surrounded by pulley 2 at a radial distance. A spring body 4, which is made of a rubber-elastic material, connects hub ring 1 to pulley 2 in a torsionally flexible manner but allows comparatively great rotation of hub ring 1 in the circumferential direction of the coupling, relative to pulley 2. Spring body 4 is situated in gap 3 formed by this distance.

In addition, a sliding-contact bearing 5 is situated in gap 3 formed by this distance. Sliding-contact bearing 5 is necessary because comparatively soft spring body 4 is unable to adequately guide hub ring 1 and pulley 2 relative to one another. Due to the use of sliding-contact bearing 5, hub ring 1 and pulley 2 are excellently mounted relative to one another, so that unwanted wobbling movements are prevented.

In this exemplary embodiment, sliding-contact bearing 5 is made of a thermoplastic polymer material, sliding-contact face 6 of sliding-contact bearing 5, with its six projections 7 distributed uniformly in the circumferential direction, being rotatably supported on surface 8 of a second axial projection 13 of hub ring 1.

FIG. 1 shows that in the upper part of the diagram, sliding-contact bearing 5 has a comparatively greater thickness, and surface 8 of second axial projection 13 of hub ring 1 comes in contact with that surface under an elastic prestress, while sliding-contact bearing 5 is designed to be comparatively thinner in the lower portion of the diagram, and it is adjacent to second axial projection 13 of hub ring 1 at a radial distance. The gap between sliding-contact surface 6 of sliding-contact bearing 5 and second axial projection 13 is designed as a lubricant pocket 21 which is filled with a lubricating grease in this exemplary embodiment. Due to the pivoting motion of pulley 2 relative to hub ring 1, lubricant is repeatedly forced out of lubricant pockets 21 beneath projections 7, resulting in a substantial reduction in the friction between sliding-contact bearing 5 and hub ring 1.

Sliding-contact bearing 5 is accommodated on the outside circumference radially in an elastic receptacle 11 in the form of a rubber strip and is held in receptacle 11 in a rotationally fixed manner by cams 10, i.e. tappets, which together with projections 7 form a one-piece component of sliding-contact bearing 5. There is no radial twisting between receptacle 11 and pulley 2. Receptacle 11 and pulley 2 are joined together frictionally engaged and/or in a form-fitting manner, in any case in a rotationally fixed manner.

When seen in longitudinal section, hub ring 1 is designed essentially in a U shape, with the first axial projection 12 on the inside radially being surrounded by the inside circumference of spring body 4 and second axial projection 13 on the outside radially being surrounded by sliding-contact bearing 5.

Figure 2:
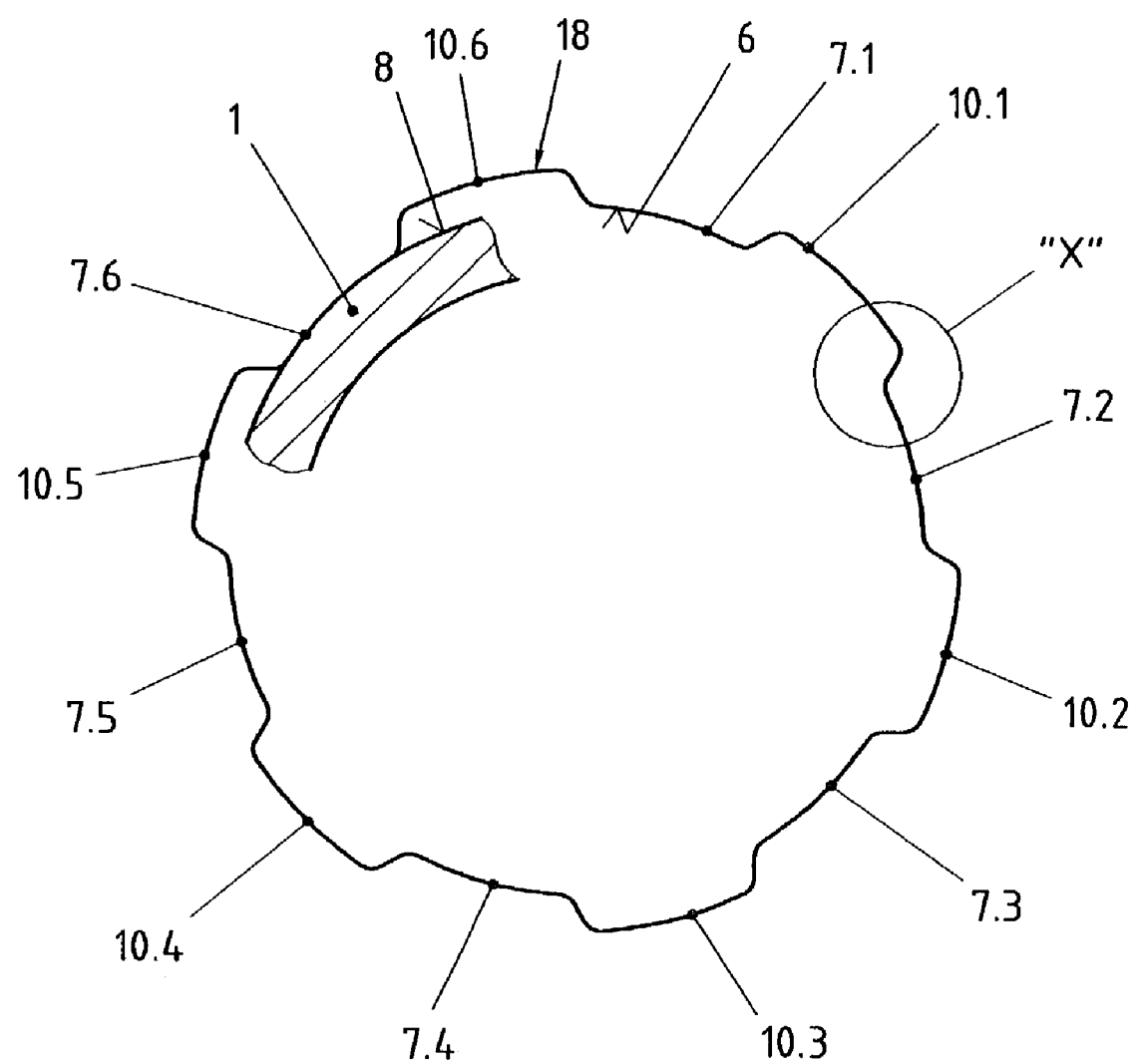
FIG. 2 shows a front view of a sliding-contact bearing from FIG. 1.

In FIG. 2, the sliding-contact bearing from FIG. 1 is shown in a view from the front. Projections 7.1, 7.2, 7.3, 7.4, 7.5, 7.6 are situated on the inside radially and are supported on surface 8 of the radially adjacent hub ring under an elastic prestress. Projections 7.1, ..., 7.6 are paired with cams 10.1, 10.2, 10.3, 10.4, 10.5, 10.6, situated on the outside circumference on sliding-contact bearing 5, in a staggered manner in this exemplary embodiment, so that when seen in the circumferential direction of sliding-contact bearing 5, the result is an essentially constant material thickness.

A differing arrangement of projections 7.1, ..., 7.6 and cams 10.1, ..., 10.6 relative to one another is also possible, however. This other pairing of projections 7.1, ..., 7.6 and cams 10.1, ..., 10.6 relative to one another results in more rapid and less expensive manufacturability of sliding-contact bearing 5 because the person responsible for manufacture of the sliding-contact bearing need not pay attention to how projections 7.1, ..., 7.6 and cams 10.1, ..., 10.6 are situated relative to one another.

Figure 4:
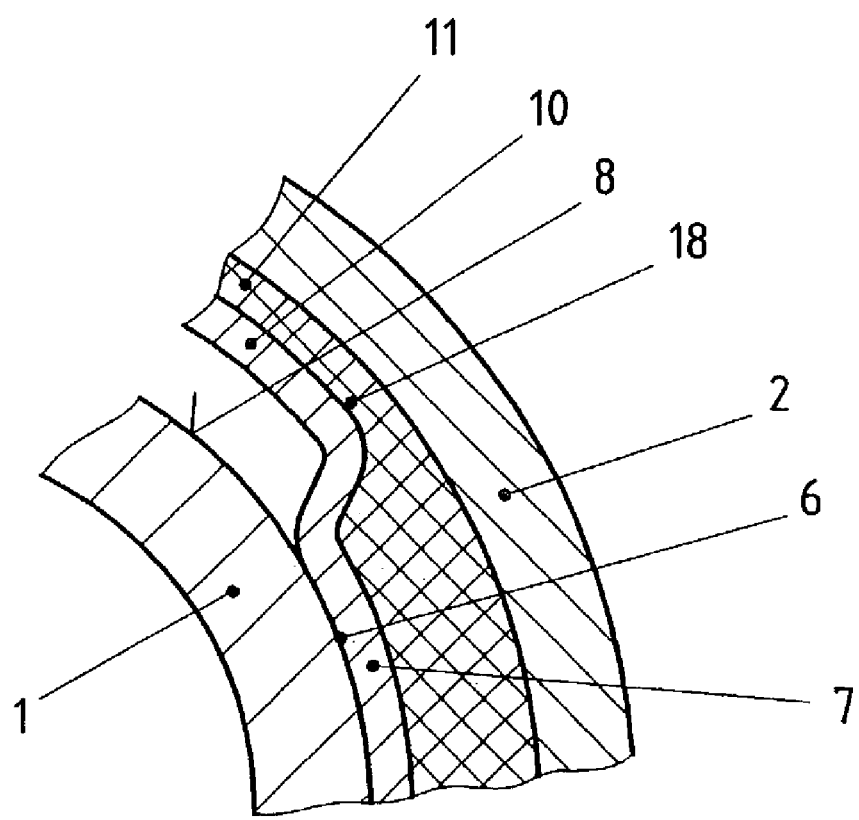
FIG. 4 shows an enlarged detail from FIG. 2 in the area of a cam of the sliding-contact bearing.

Cams 10.1, ..., 10.6 are designed as anti-twist elements and are supported, e.g., in elastic receptacle 11, shown in FIG. 4, during use of sliding-contact bearing 5 as intended.

Figure 3:
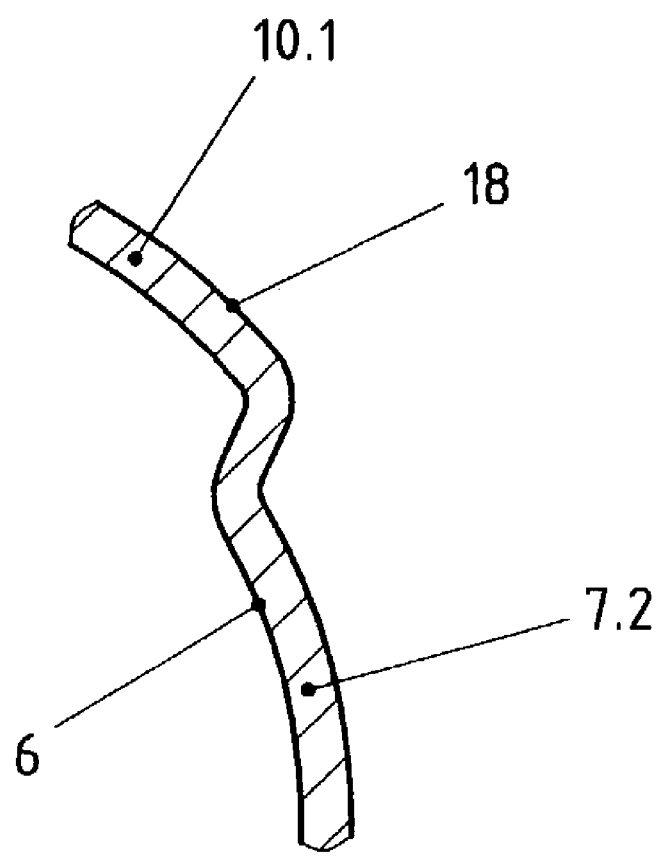
FIG. 3 shows an enlarged detail in the area of a projection.

FIG. 3 shows an enlarged detail of the sliding-contact bearing from FIG. 2 in the area of a projection 7.2. Projection 7.2 has an essentially trapezoidal cross section and comes in contact with second axial projection 13 of hub ring 1 under elastic prestress. The partial areas adjacent in the circumferential direction are situated opposite second axial projection 13 of hub ring 1 at a radial distance, with lubricant being provided in the gap formed by this distance, to reduce the friction between projection 7.2 and second axial projection 13.

FIG. 4 shows a prefabricatable unit composed of sliding-contact bearing 5, shown in FIG. 2, and elastic receptacle 11. Elastic receptacle 11 is formed by a rubber strip and surrounds sliding-contact bearing 5 on the outside circumference. Due to the fact that elastic receptacle 11 has a largely constant thickness and is situated in a cylindrical recess in pulley 2, this results in an increased specific prestress in the area of cams 10.1, ..., 10.6. Sliding-contact bearing 5 is therefore situated in a rotationally fixed manner within pulley 2 due to elastic receptacle 11. Projections 7.1, ..., 7.6 come in contact with second axial projection 13 under elastic prestress.

Cams 10.1, ..., 10.6 have a trapezoidal design, as seen in cross section, and form an anti-twist element with respect to elastic receptacle 11 which is joined to pulley 2 in a rotationally fixed manner.

Figure 5:
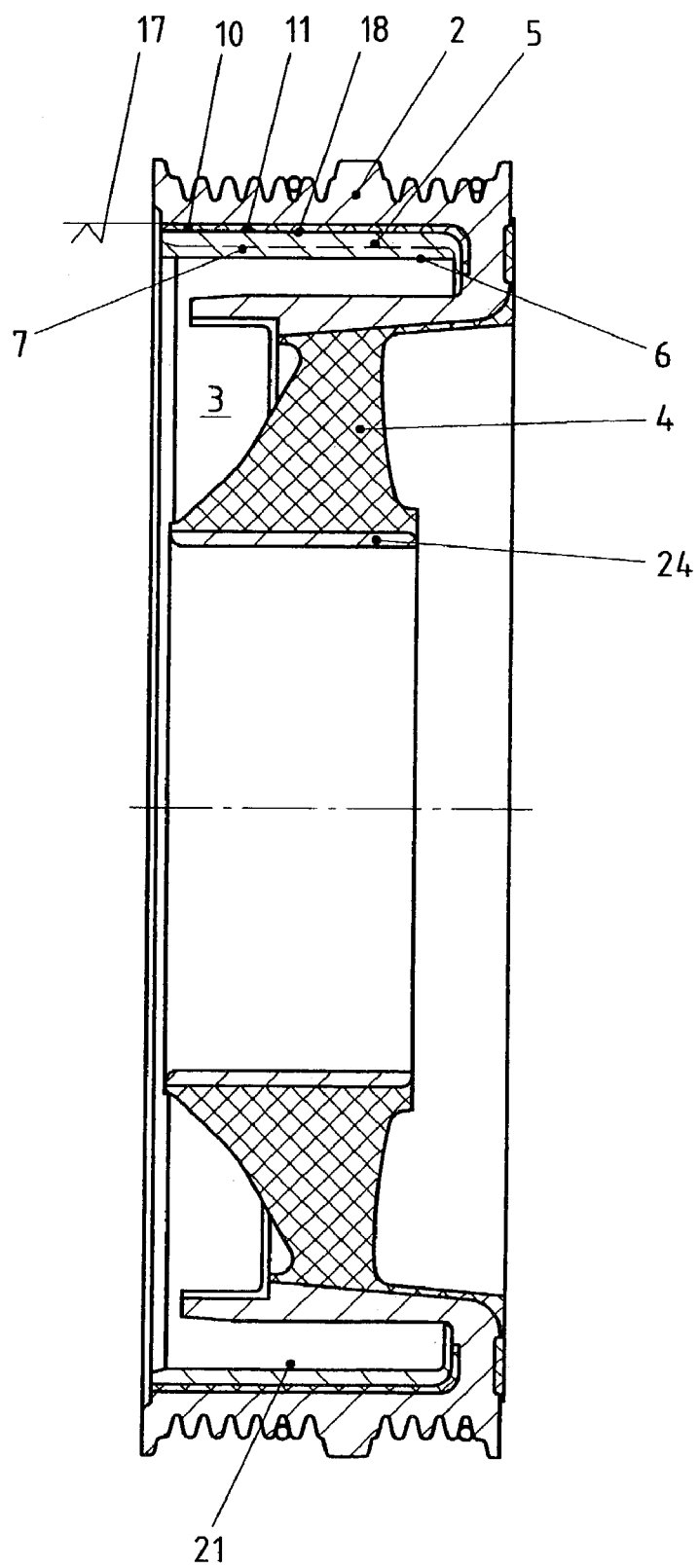
FIG. 5 shows the prefabricatable unit from FIG. 1 in a sectional view.

FIG. 5 shows the prefabricatable unit described above as a single part. The prefabricatable unit includes pulley 2 and sliding-contact bearing 5 which is connected to it by elastic receptacle 11, a projection 7 pointing radially inward being shown in the upper part of the diagram. The broken line in sliding-contact bearing 5 shows the thickness of the areas of sliding-contact bearing 5 which are adjacent to projections 7 on both sides in the peripheral direction.

Spring body 4 is vulcanized with pulley 2 and a supporting body 24, supporting body 24 being pressed onto first axial projection 12 of hub ring 1 during assembly of the torsionally flexible coupling.

Figure 6:
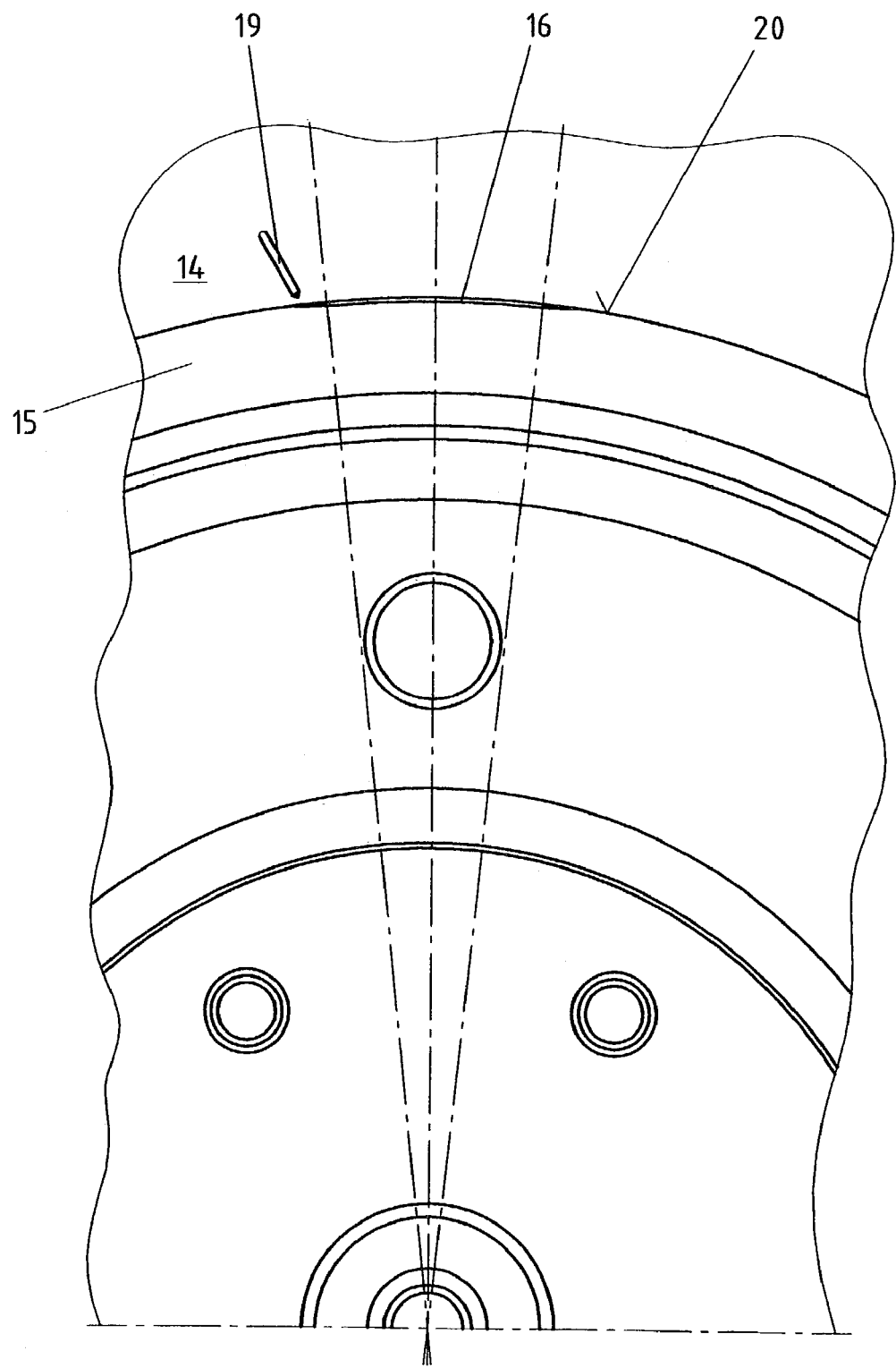
FIG. 6 shows a detail from the core of the vulcanization mold in a top view.

Core 15 of the vulcanization mold is shown in a top view in FIG. 6. Core 15 is situated in a mold cavity 14 and is provided with six flattened regions 16 distributed uniformly in the circumferential direction and provided on the outside circumference. To manufacture it, pulley 2 and a sliding-contact bearing blank 5 are placed in mold cavity 14, with sliding-contact bearing blank 5 surrounding core 15 on the outside circumference. On injection of elastomer material for elastic receptacle 11 through injection nozzles 19, sliding-contact surface 6 of sliding-contact bearing blank 5 comes to rest on the surface of core 15 on the outside circumference without any play; sliding-contact bearing blank 5 also comes to rest on flattened regions 16. Flattened regions 16 correspond in shape and size to projections 7 of ready-to-use sliding-contact bearing 5. To produce receptacle 11, free-flowing elastomer material is injected into the annular gap between pulley 2 and sliding-contact bearing blank 5, whereupon sliding-contact bearing blank 5 automatically comes to rest against surface 20 of the core, which is provided with flattened regions 16, due to the production process and the injection pressure and temperature.

Following production of the prefabricatable unit shown in FIG. 5, it is completed with hub ring 1 to form the torsionally flexible coupling.

Figure 7:
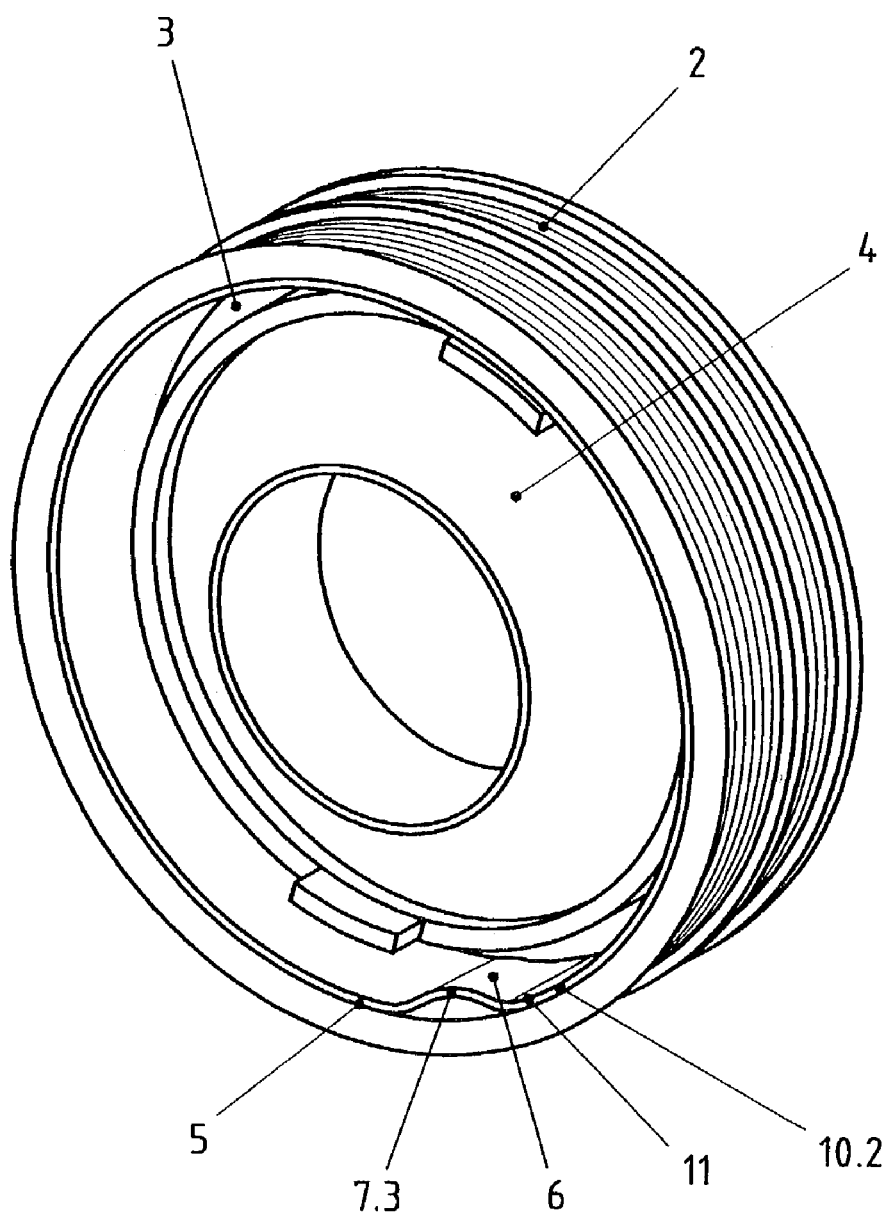
FIG. 7 shows an exemplary embodiment of a prefabricatable unit including the pulley, the elastic receptacle and the sliding-contact bearing in a perspective diagram.

FIG. 7 shows the prefabricatable unit from FIG. 5 in a perspective view.

LIST OF ELEMENTS

1 hub ring
2 pulley
3 gap between 1 and 2
4 spring body
5 sliding-contact bearing
6 sliding-contact face
7 projection
8 surface of 1
9 surface of 2
10 cam
11 elastic receptacle
12 first axial projection on the inside of 1
13 second axial projection on the outside of 1
14 mold cavity
15 core
16 flattened regions on the core
17 inside circumference of the pulley
18 outside circumference of the sliding-contact bearing
19 injection nozzles
20 surface of the core
21 lubricant pockets
22 flywheel
23 second spring body
24 supporting body

What is claimed is:

1. A torsionally flexible coupling comprising
   a hub ring;
   a vibrationally isolated pulley surrounding the hub ring at a radial distance;
   a spring body made of a rubber-elastic material being situated in a gap formed by the distance; and
   a sliding-contact bearing for mutual support of the hub ring and the pulley, the sliding-contact bearing having a sliding-contact surface and at least one cam on a side facing the hub ring or the pulley, the sliding-contact surface having at least one elastically flexible projection in the radial direction, the at least one projection contacting a surface of the hub ring or the pulley under elastic prestress, the cam being designed as an anti-twist element in a rotationally fixed engagement with an elastic receptacle, the elastic receptacle being situated between the pulley and the sliding contact bearing in the radial direction or between the hub ring and the sliding contact bearing.

2. The coupling as recited in claim 1, wherein the sliding-contact bearing is designed in one piece and of a uniform material.

3. The coupling as recited in claim 1, wherein the sliding-contact bearing is made of a thermoplastic polymer material.

4. The coupling as recited in claim 1, wherein the at least one projection includes at least three projections distributed uniformly in a circumferential direction of the sliding-contact bearing.

5. The coupling as recited in claim 1, wherein the sliding-contact bearing has at least one cam on the side facing the pulley or the hub ring, and the cam is designed as an anti-twist element.

6. The coupling as recited in claim 5 wherein the cam is in a rotationally fixed engagement with an elastic receptacle, and the elastic receptacle is situated between the pulley and the sliding-contact bearing in the radial direction or between the hub ring and the sliding-contact bearing.

7. The coupling as recited in claim 6 wherein the pulley, the receptacle, and the sliding-contact bearing, or the hub ring, the receptacle, and the sliding-contact bearing together form a prefabricatable unit.

8. The coupling as recited in claim 6 wherein the receptacle is designed as a rubber strip which is joined to the sliding-contact bearing in a friction-locked and/or form-fitting rotationally fixed manner.

9. The coupling as recited in claim 1, wherein the hub ring, in longitudinal section, has a U-shape with a first axial projection radially inside being surrounded by an inside circumference of the spring body and a second axial projection radially outside being surrounded by the sliding-contact bearing.

10. The torsionally flexible coupling as recited in claim 1, wherein the spring body connects the hub ring to the pulley in a torsionally flexible manner.

11. The coupling as recited in claim 1 wherein the pulley, the receptacle, and the sliding-contact bearing, or the hub ring, the receptacle, and the sliding-contact bearing together form a prefabricatable unit.

12. The coupling as recited in claim 1 wherein the receptacle is designed as a rubber strip which is joined to the sliding-contact bearing in a friction-locked and/or form-fitting rotationally fixed manner.

* * * * *